(12) United States Patent
Hatada (10) Patent No.: US 8,771,888 B2
(45) Date of Patent: *Jul. 8, 2014

(54) FUEL CELL SYSTEM AND METHOD OF LOAD FOLLOWING OPERATION OF THE SAME

(75) Inventor: Susumu Hatada, Kanagawa (JP)

(73) Assignee: JX Nippon Oil & Energy Corporation (JP)

(*) Notice: Subject to any disclaimer, the term of this patent is extended or adjusted under 35 U.S.C. 154(b) by 541 days.

This patent is subject to a terminal disclaimer.

(21) Appl. No.: 12/934,992

(22) PCT Filed: Feb. 18, 2009

(86) PCT No.: PCT/JP2009/052745
§ 371 (c)(1),
(2), (4) Date: Sep. 27, 2010

(87) PCT Pub. No.: WO2009/119188
PCT Pub. Date: Oct. 1, 2009

(65) Prior Publication Data
US 2011/0027676 A1    Feb. 3, 2011

(30) Foreign Application Priority Data
Mar. 27, 2008 (JP) .................. 2008-083351

(51) Int. Cl.
*H01M 8/06* (2006.01)
(52) U.S. Cl.
USPC ........... 429/425; 429/408; 429/416; 429/423; 429/427; 429/428
(58) Field of Classification Search
USPC ................. 429/408, 416, 423, 425, 427–428; 423/650–654
See application file for complete search history.

(56) References Cited

U.S. PATENT DOCUMENTS

| 2002/0102447 A1 | 8/2002 | Kato | |
|---|---|---|---|
| 2004/0013917 A1* | 1/2004 | Ukai et al. | 429/19 |

(Continued)

FOREIGN PATENT DOCUMENTS

| JP | 60-56374 A | 4/1985 |
|---|---|---|
| JP | 63-314769 A | 12/1988 |

(Continued)

OTHER PUBLICATIONS

International Search Report for International Application No. PCT/JP2009/052745 mailed Mar. 24, 2009 with English translation.

(Continued)

*Primary Examiner* — Jonathan G Leong
*Assistant Examiner* — James Erwin
(74) *Attorney, Agent, or Firm* — Cantor Colburn LLP

(57) ABSTRACT

Provided is a fuel-cell system and a method of operating the fuel-cell system, wherein functions F=f(P) and P=f-1(F) of electrical output P and fuel flow-rate F required to output P are beforehand obtained, and a reformable fuel flow-rate $F_R$ is calculated from the temperature of reforming catalyst layer. When $F_R \geq F_{min}$, if the output demand $P_D \leq$ maximum output $P_M$, and when $f(P_D) \leq F_R$, F is set to $f(P_D)$; and when $f(P_D) > F_R$, the P is set to the maximum value within a range of less than $P_D$ amongst P calculated from P=f¹($F_R$), and F is set to FR. When $P_D > P_M$, and when $f(P_M) \leq F_R$, the cell output is set to $P_M$, and F is set to $f(P_M)$. When $f(P_M) > F_R$, the cell output is set to the maximum value amongst P calculated from P=f¹($F_R$), and F is set to $F_R$.

8 Claims, 7 Drawing Sheets

(56) References Cited

U.S. PATENT DOCUMENTS

| | | |
|---|---|---|
| 2004/0038095 A1 | 2/2004 | Kushibiki et al. |
| 2005/0208664 A1 | 9/2005 | Keegan et al. |
| 2005/0214607 A1 | 9/2005 | Imahashi et al. |
| 2005/0260123 A1* | 11/2005 | Deluga et al. ............... 423/652 |
| 2006/0046109 A1 | 3/2006 | Mizukami et al. |
| 2007/0141417 A1* | 6/2007 | Bitoh ........................... 429/23 |
| 2010/0119888 A1 | 5/2010 | Song et al. |
| 2010/0173208 A1 | 7/2010 | Hatada |
| 2010/0279185 A1 | 11/2010 | Hatada |
| 2011/0027676 A1 | 2/2011 | Hatada |

FOREIGN PATENT DOCUMENTS

| | | |
|---|---|---|
| JP | 2001-185196 A | 7/2001 |
| JP | 2002-231287 A | 8/2002 |
| JP | 2004-178962 A | 6/2004 |
| JP | 2004-319420 A | 11/2004 |
| JP | 2006-008458 A | 1/2006 |
| JP | 2006-032262 A | 2/2006 |
| JP | 2006-107956 A | 4/2006 |
| JP | 2007-220620 A | 8/2007 |
| JP | 2007-311288 A | 11/2007 |
| JP | 2008-300069 A | 12/2008 |
| JP | 2008-311030 A | 12/2008 |
| JP | 2009-137778 A | 6/2009 |
| JP | 2009-238591 A | 10/2009 |
| TW | 200737580 D2 | 8/1995 |
| TW | 200733465 B1 | 12/1995 |
| WO | 2008149504 A1 | 12/2008 |

OTHER PUBLICATIONS

Extended European Report for Application No. /Patent No. 09725062.5-1227/2267828, dated Mar. 15, 2012.
Extended European Search Report for European Application No. 10794076.5-1360/2450993, dated Oct. 15, 2013.
International Search Report to International Application No. PCT/JP2010/060819, mailed Sep. 28, 2010 with English translation.
Taiwanese Office Action for Patent Application No. 098109914, dated Oct. 29, 2013, with English translation.

\* cited by examiner

FUEL CELL SYSTEM AND METHOD OF LOAD FOLLOWING OPERATION OF THE SAME

CROSS REFERENCE TO RELATED APPLICATIONS

This is a U.S. national stage application of International Application No. PCT/JP2009/052745, filed on 18 Feb. 2009. Priority under 35 U.S.C. §119(a) and 35 U.S.C. §365(b) is claimed from Japanese Application No. JP2008-083351, filed 27 Mar. 2008, the disclosure of which is also incorporated herein by reference.

TECHNICAL FIELD

The present invention relates to a fuel cell system that generates electric power using a reformed gas obtained by reforming a hydrocarbon-based fuel, such as kerosene.

BACKGROUND ART

A solid oxide fuel cell (hereinafter sometimes referred to as SOFC) system usually includes a reformer for reforming a hydrocarbon-based fuel, such as kerosene and city gas, to generate a hydrogen-containing gas (reformed gas), and an SOFC for electrochemically reacting the reformed gas and air for electric power generation.

The SOFC is usually operated at a high temperature of 550 to 1000° C.

Various reactions, such as steam reforming (SR), partial oxidation reforming (PDX), and autothermal reforming (ATR), are used for reforming, and heating to a temperature at which catalytic activity is exhibited is necessary for using a reforming catalyst.

Steam reforming is a very largely endothermic reaction. Also, the reaction temperature of the steam reforming is 550 to 750° C., which is relatively high, and the steam reforming requires a high temperature heat source. Therefore, an internal reforming SOFC is known in which a reformer (internal reformer) is installed near an SOFC, and the reformer is heated mainly using radiant heat from the SOFC as a heat source (Patent Document 1).

Also, proposals on the load following operation of a fuel cell system are made in Patent Documents 2 and 3.
Patent Document 1: JP2004-319420A
Patent Document 2: JP2001-185196A
Patent Document 3: JP2006-32262A

DISCLOSURE OF THE INVENTION

Problems to be Solved by the Invention

When a hydrocarbon-based fuel is not reformed to a predetermined composition, and an unreformed component is supplied to an SOFC, anode degradation and flow blockage due to carbon deposition may occur, particularly when a heavy hydrocarbon, such as kerosene, is used as the hydrocarbon-based fuel.

An SOFC system may be subjected to load following operation. In other words, an SOFC system may be subjected to an operation in which the amount of electric power generation of the SOFC system is varied according to the fluctuation of electric power demand. For example, when the amount of electric power generation is increased, the feed rate of the hydrocarbon-based fuel to the SOFC system may be increased. In such a case, carbon may be deposited. Therefore, it is desired to reliably reform the hydrocarbon-based fuel also in the load following operation. In the arts disclosed in Patent Documents 2 and 3, improvement is still desired in terms of performing reliable reforming.

This is true not only for the SOFC system, but also for a fuel cell system having a high temperature fuel cell, such as a molten carbonate fuel cell (MCFC).

It is an object of the present invention to provide a method in which when performing load following operation of a fuel cell system including a reformer having a reforming catalyst layer and a high temperature fuel cell, reforming can be more reliably performed to more reliably prevent flow blockage and anode degradation.

It is another object of the present invention to provide a fuel cell system suitable for performing such a method.

Means for Solving the Problems

The present invention provides a method for performing load following operation of a fuel cell system including a reformer having a reforming catalyst layer, for reforming a hydrocarbon-based fuel to produce a reformed gas containing hydrogen, and a high temperature fuel cell for generating electric power using the reformed gas, wherein functions $F=f(P)$ and $P=f^{-1}(F)$ of an electrical output P of the fuel cell and a flow rate F of the hydrocarbon-based fuel required to be supplied to the reforming catalyst layer in order to output the electrical output P from the fuel cell are obtained beforehand, where $P=f^{-1}(F)$ is an inverse function of $F=f(P)$, a maximum electrical output of the fuel cell is represented as $P_M$, and a minimum value of a flow rate of the hydrocarbon-based fuel determined by the function $F=f(P)$, when P is within the range of 0 or more and $P_M$ or less, is represented as $F_{min}$, the method including:

A) measuring a temperature of the reforming catalyst layer;

B) calculating a reformable flow rate $F_R$ that is a flow rate of the hydrocarbon-based fuel that can be reformed in the reforming catalyst layer, based on the measured temperature of the reforming catalyst layer;

C) when the calculated reformable flow rate $F_R$ is smaller than the minimum value $F_{min}$, stopping electric power generation in the fuel cell; and D) when the calculated reformable flow rate $F_R$ is equal to or more than the minimum value $F_{min}$, performing step d1 if a fuel cell output demand value $P_D$ is equal to or less than the maximum electrical output $P_M$, and performing step d2 if the fuel cell output demand value $P_D$ exceeds the maximum electrical output $P_M$, d1) calculating a flow rate $f(P_D)$ of the hydrocarbon-based fuel required to be supplied to the reforming catalyst layer in order to output the fuel cell output demand value $P_D$ from the fuel cell, using the function $F=f(P)$, if $f(P_D)$ is equal to or less than the calculated reformable flow rate $F_R$, setting an electrical output of the fuel cell to $P_D$, and setting a flow rate of the hydrocarbon-based fuel supplied to the reforming catalyst layer to $f(P_D)$, and if $f(P_D)$ exceeds the calculated reformable flow rate $F_R$, setting the electrical output of the fuel cell to a P value that is the highest within a range of less than $P_D$ from amongst one or more P values calculated from $P=f^{-1}(F_R)$, and setting the flow rate of the hydrocarbon-based fuel supplied to the reforming catalyst layer to $F_R$, d2) calculating a flow rate $f(P_M)$ of the hydrocarbon-based fuel supplied to the reforming catalyst layer required to be supplied to the reforming catalyst layer in order to output the maximum electrical output $P_M$ from the fuel cell, using the function F=f(P), if $f(P_M)$ is equal to or less than the calculated reformable flow rate $F_R$, setting the electrical output of the fuel cell to $P_M$, and setting the flow rate of the hydrocarbon-based fuel supplied to the reforming catalyst layer to $f(P_M)$, and if $f(P_M)$ exceeds the calculated reformable flow rate $F_R$, setting the electrical output of the fuel cell to a P value that is the highest from amongst one or more P values calculated from $P=f^{-1}(F_R)$, and setting the flow rate of the hydrocarbon-based fuel supplied to the reforming catalyst layer to $F_R$.

Steps A to D may be repeatedly performed during the load following operation.

The hydrocarbon-based fuel may include a hydrocarbon-based fuel(s) with a carbon number of two or more.

The concentration of a compound(s) with a carbon number of two or more in the reformed gas may be 50 ppb or less on a mass basis.

The present invention provides a fuel cell system including a reformer having a reforming catalyst layer, for reforming a hydrocarbon-based fuel to produce a reformed gas containing hydrogen, and a high temperature fuel cell for generating electric power using the reformed gas, wherein a function of an electrical output P of the fuel cell and a flow rate F of the hydrocarbon-based fuel required to be supplied to the reforming catalyst layer in order to output the electrical output P from the fuel cell is represented as F=f(P), and an inverse function of F=f(P) is represented as $P=f^{-1}(F)$, a maximum electrical output of the fuel cell is represented as $P_M$, and a minimum value of a flow rate of the hydrocarbon-based fuel determined by the function F=f(P), when P is within the range of 0 or more and $P_M$ or less, is represented as $F_{min}$, the system including:

I) a means for measuring a temperature of the reforming catalyst layer;

II) a means for calculating a reformable flow rate $F_R$ that is a flow rate of the hydrocarbon-based fuel that can be reformed in the reforming catalyst layer, based on the measured temperature of the reforming catalyst layer;

III) a means for, when the calculated reformable flow rate $F_R$ is smaller than the minimum value $F_{min}$, stopping electric power generation in the fuel cell; and IV) a means for, when the calculated reformable flow rate $F_R$ is equal to or more than the minimum value $F_{min}$, performing step d1 if a fuel cell output demand value $P_D$ is equal to or less than the maximum electrical output $P_M$, and performing step d2 if the fuel cell output demand value $P_D$ exceeds the maximum electrical output $P_M$, d1) calculating a flow rate $f(P_D)$ of the hydrocarbon-based fuel required to be supplied to the reforming catalyst layer in order to output the fuel cell output demand value $P_D$ from the fuel cell, using the function F=f(P), if $f(P_D)$ is equal to or less than the calculated reformable flow rate $F_R$, setting an electrical output of the fuel cell to $P_D$, and setting a flow rate of the hydrocarbon-based fuel supplied to the reforming catalyst layer to $f(P_D)$, and if $f(P_D)$ exceeds the calculated reformable flow rate $F_R$, setting the electrical output of the fuel cell to a P value that is the highest within a range of lower than $P_D$ from amongst one or more P values calculated from $P=f^{-1}(FR)$, and setting the flow rate of the hydrocarbon-based fuel supplied to the reforming catalyst layer to $F_R$, d2) calculating a flow rate $f(P_M)$ of the hydrocarbon-based fuel supplied to the reforming catalyst layer required to be supplied to the reforming catalyst layer in order to output the maximum electrical output $P_M$ from the fuel cell, using the function F=f(P), if $f(P_M)$ is equal to or less than the calculated reformable flow rate $F_R$, setting the electrical output of the fuel cell to $P_M$, and setting the flow rate of the hydrocarbon-based fuel supplied to the reforming catalyst layer to $f(P_M)$, and if $f(P_M)$ exceeds the calculated reformable flow rate $F_R$, setting the electrical output of the fuel cell to a P value that is the highest from amongst one or more P values calculated from $P=f^{-1}(F_R)$, and setting the flow rate of the hydrocarbon-based fuel supplied to the reforming catalyst layer to $F_R$, Advantages of the Invention The present invention provides a method in which, when performing load following operation of a fuel cell system including a reformer having a reforming catalyst layer and a high temperature fuel cell, reforming can be more reliably performed to more reliably prevent flow blockage and anode degradation.

Also, the present invention provides a fuel cell system suitable for performing such a method.

DESCRIPTION OF SYMBOLS

1 water vaporizer
2 electrical heater annexed to water vaporizer
3 reformer
4 reforming catalyst layer
5 thermocouple
6 SOFC
7 igniter 8 module container
9 electrical heater annexed to reformer
10 computer
11 flow rate control valve
12 flowmeter
13 thermocouple
14 electric power conditioner

BEST MODE FOR CARRYING OUT THE INVENTION

A fuel cell system used in the present invention includes a reformer for reforming a hydrocarbon-based fuel to produce a hydrogen-containing gas, and a high temperature fuel cell. The reformer includes a reforming catalyst layer. The hydrogen-containing gas obtained from the reformer is referred to as reformed gas. The reforming catalyst layer is composed of a reforming catalyst that can promote a reforming reaction. The high temperature fuel cell generates electric power, using the hydrogen-containing gas (reformed gas) obtained from the reformer.

The embodiments of the present invention will be described below, using drawings, but the present invention is not limited thereto.

[Indirect Internal Reforming SOFC System]

Figure 1:
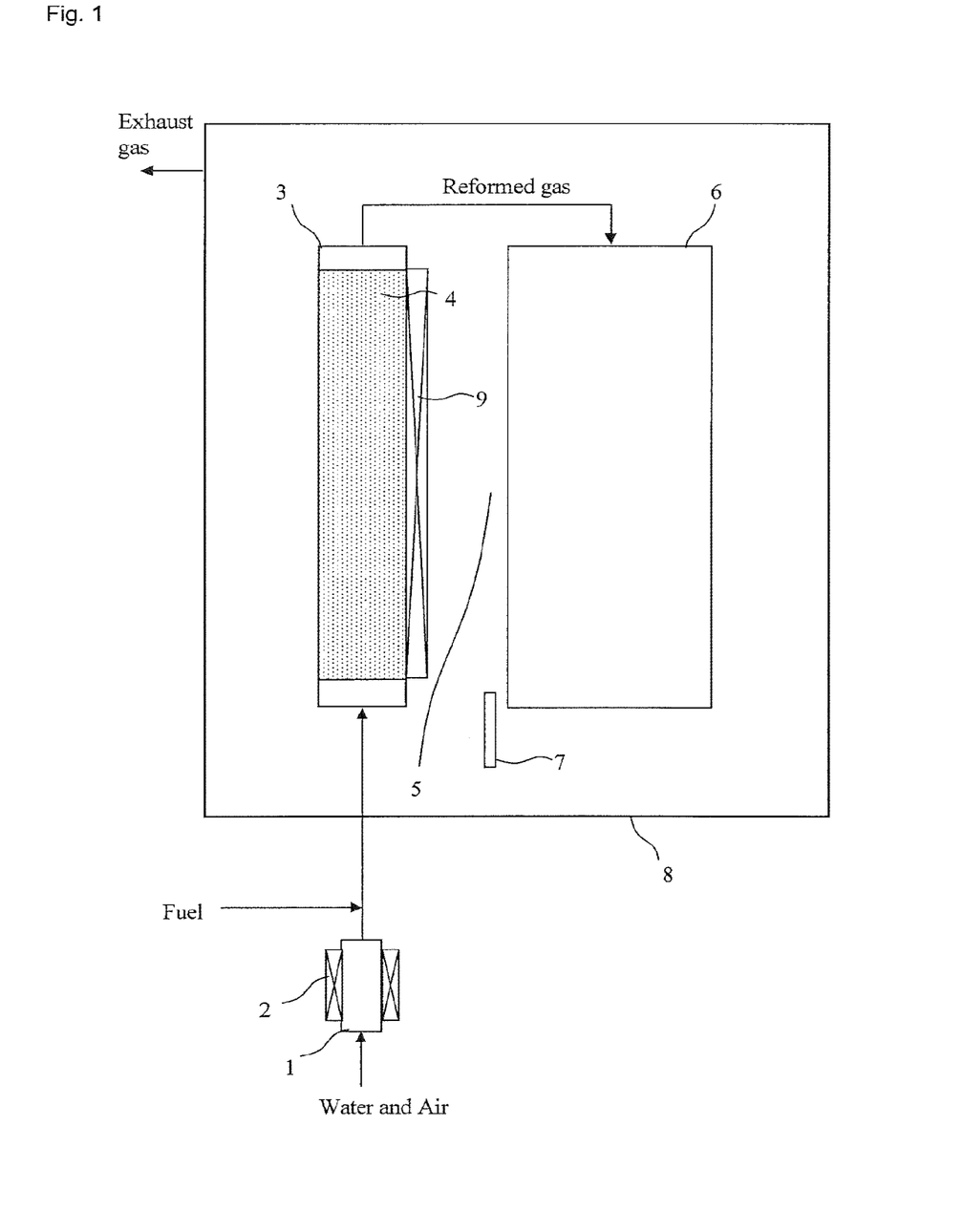
FIG. 1 is a schematic diagram showing the outline of an example of an indirect internal reforming SOFC system that can perform the present invention.

An embodiment of an indirect internal reforming SOFC system that can perform the present invention is schematically shown in FIG. 1. Here, the indirect internal reforming SOFC system will be described, but the present invention can also be applied to an external reforming SOFC system or an MCFC system.

The indirect internal reforming SOFC includes a reformer 3 for reforming a hydrocarbon-based fuel to produce a reformed gas (hydrogen-containing gas). The reformer includes a reforming catalyst layer 4.

The indirect internal reforming SOFC includes an SOFC 6 for generating electric power using the above reformed gas, and also includes a combustion region 5 for combusting an anode off-gas discharged from the SOFC (particularly the anode of the SOFC).

The indirect internal reforming SOFC includes an enclosure 8 for housing the reformer, the solid oxide fuel cell, and the combustion region.

The indirect internal reforming SOFC refers to the enclosure (module container) 8 and equipment included in the interior of the enclosure.

In the indirect internal reforming SOFC of the embodiment shown in FIG. 1, an igniter 7 that is an ignition means for igniting the anode off-gas is provided, and also, the reformer is equipped with an electrical heater 9.

Each supply gas is supplied to the reformer or the SOFC, after being appropriately preheated as required.

A water vaporizer 1 equipped with an electrical heater 2 is connected to the indirect internal reforming SOFC, and piping for supplying the hydrocarbon-based fuel to the reformer is connected to the midstream of connection piping for the water vaporizer 1. The water vaporizer 1 generates steam by heating with the electrical heater 2. The steam may be supplied to the reforming catalyst layer after being appropriately superheated in the water vaporizer or downstream thereof.

Also, air (for a partial oxidation reforming reaction) may be supplied to the reforming catalyst layer, and here, air can be supplied to the reforming catalyst layer after being preheated in the water vaporizer. Steam or a mixed gas of air and steam can be obtained from the water vaporizer.

The steam or the mixed gas of air and steam is mixed with the hydrocarbon-based fuel and supplied to the reformer 3, particularly to the reforming catalyst layer 4 of the reformer 3. When a liquid fuel, such as kerosene, is used as the hydrocarbon-based fuel, the hydrocarbon-based fuel may be supplied to the reforming catalyst layer after being appropriately vaporized.

The reformed gas obtained from the reformer is supplied to the SOFC 6, particularly to the anode of the SOFC 6. Although not shown, air is appropriately preheated and supplied to the cathode of the SOFC.

Combustible components in the anode off-gas (gas discharged from the anode) are combusted by oxygen in a cathode off-gas (gas discharged from the cathode) at the SOFC outlet. In order to do this, ignition using the igniter 7 is possible. The outlets of both the anode and the cathode are open in the module container 8. The combustion gas is appropriately discharged from the module container.

The reformer and the SOFC are housed in one module container and modularized. The reformer is disposed at a position where it can receive heat from the SOFC. For example, when the reformer is located at a position where it receives thermal radiation from the SOFC, the reformer is heated by thermal radiation from the SOFC during electric power generation.

In the indirect internal reforming SOFC, the reformer is preferably disposed at a position where radiation heat can be directly transferred from the SOFC to the outer surface of the reformer. Therefore, it is preferred that there is substantially no obstacle between the reformer and the SOFC, that is, it is preferred to make the region between the reformer and the SOFC be an empty space. Also, the distance between the reformer and the SOFC is preferably as short as possible.

The reformer 3 is heated by the combustion heat of the anode off-gas generated in the combustion region 5. Also, when the temperature of the SOFC is higher than that of the reformer, the reformer is also heated by radiation heat from the SOFC.

Further, the reformer may be heated by heat generation by reforming. When the reforming is partial oxidation reforming, or when the reforming is autothermal reforming and heat generation by a partial oxidation reforming reaction is larger than endothermic heat by a steam reforming reaction, heat is generated with the reforming.

[Load Following Operation Method]

Figure 6:
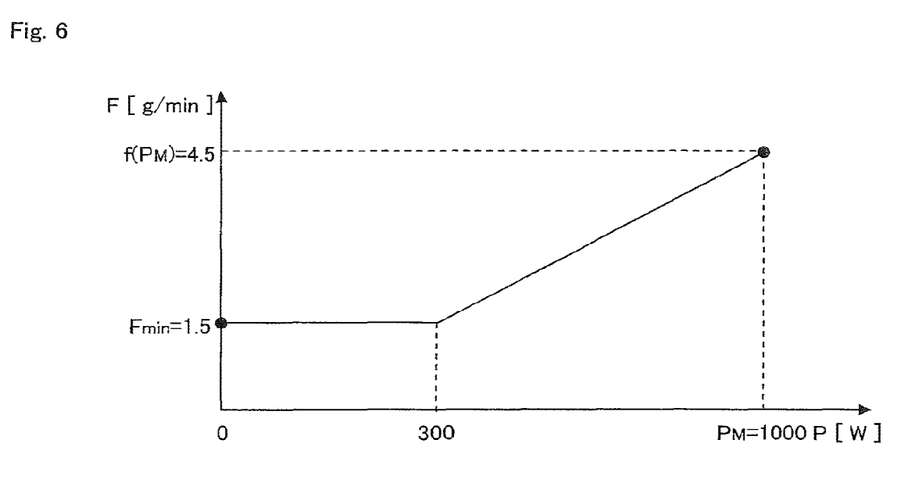
FIG. 6 is a schematic graph showing a correlation between electrical output P of a fuel cell and flow rate F of a hydrocarbon-based fuel required to be supplied to a reforming catalyst layer to obtain the electrical output P, for explaining the method of the present invention.

In the present invention, functions $F=f(P)$ and $P=f^{-1}(F)$ of the electrical output P of the fuel cell and the flow rate F of the hydrocarbon-based fuel required to be supplied to the reforming catalyst layer in order to output the electrical output P from the fuel cell are beforehand obtained. $P=f^{-1}(F)$ is the inverse function of $F=f(P)$. F is uniquely determined with respect to a certain electrical output P, and there may exist one or a plurality of P with respect to a certain F. F with respect to a certain electrical output P is logically uniquely determined, for example, by beforehand determining an electric current and a fuel utilization rate with respect to a certain electrical output P by preliminary experiment, simulation, or the like so that the electric power generation efficiency is as high as possible, while the SOFC is maintained at a temperature at which electric power can be preferably generated. In addition, for example, there is a case where the flow rate of the hydrocarbon-based fuel with respect to a certain electrical output P or less is constant, as shown in FIG. 6, in order to maintain the SOFC at a temperature at which electric power can be preferably generated even when the electrical output is small. In this case, there are a plurality of P with respect to a certain F.

The flow rate of a fluid supplied to the indirect internal reforming SOFC, other than the hydrocarbon-based fuel, and the input and output of electricity to and from the indirect internal reforming SOFC, other than the output of the fuel cell, may be beforehand obtained as functions of the electrical output P, as required. For example, in order to suppress carbon deposition, the flow rate of water supplied to the reformer may be obtained beforehand so that the steam/carbon ratio (ratio of the number of moles of water molecules to the number of moles of carbon atoms in the gas supplied to the reforming catalyst layer) is a predetermined value. The flow rate of air supplied to the reformer may be obtained beforehand so that the oxygen/carbon ratio (ratio of the number of moles of oxygen molecules to the number of moles of carbon atoms in the gas supplied to the reforming catalyst layer) is a predetermined value. The flow rate of a fluid supplied to the indirect internal reforming SOFC, other than the water and air supplied to the reformer, and the input and output of electricity to and from the indirect internal reforming SOFC may be obtained beforehand by preliminary experiment, simulation, or the like so that the electric power generation efficiency is as high as possible, while the SOFC is maintained at a temperature at which electric power can be preferably generated. By doing so, the flow rate and electrical input and output may be determined using beforehand obtained functions, when the output of the fuel cell is set to a certain value P.

Here, $P_M$ is the maximum electrical output of the fuel cell. $P_M$ is beforehand determined as one of the specifications of the fuel cell system. Also, $F_{min}$, is the minimum value of the flow rate of the hydrocarbon-based fuel determined by the function $F=f(P)$, when P is within the range of 0 or more and $P_M$ or less. Further, $F_{max}$ is the maximum value of the flow rate of the hydrocarbon-based fuel determined by the function $F=f(P)$, when P is within the range of 0 or more and $P_M$ or less.

In this case, it is enough that the functions $F=f(P)$ and $P=f^{-1}(F)$ are determined within the range of $0 \leq P \leq P_M$ and $F_{min} \leq F \leq F_{max}$.

By preferably repeatedly performing steps A to D, that is, repeatedly performing the step A, the step B, and the step C or D in this order, during load following operation, reforming can be more reliably performed to more reliably prevent the degradation of the anode.

[Step A]

When load fluctuation operation is actually performed, the step A of measuring the temperature of the reforming catalyst layer is performed. This measurement may be continuously performed while the load following operation is performed.

The step A is performed to find the temperature T of the reforming catalyst layer used when a reformable flow rate $F_R$ described later is calculated. The step A is preferably started in a time as short as possible from the point of time of the start of the load following operation. The step A is preferably started immediately after the load following operation is started. When the monitoring (continuous measurement) of the temperature of the reforming catalyst layer has been performed since before the start of the load following operation, the temperature monitoring may be continuously performed as it has been.

An appropriate temperature sensor, such as a thermocouple, may be used for the temperature measurement.

[Step B]

In the step B, the flow rate of the hydrocarbon-based fuel that can be reformed in the reforming catalyst layer (reformable flow rate $F_R$) is calculated based on the measured temperature of the reforming catalyst layer. The calculation method will be described in detail later.

[Step C]

When the reformable flow rate $F_R$ calculated in the step B is smaller than the above minimum value $F_{min}$ (the minimum value of the flow rate of the hydrocarbon-based fuel determined by the function $F=f(P)$, when P is within the range of 0 or more and $P_M$ or less), electric power generation in the fuel cell is stopped. In other words, when $F_R < F_{min}$, the requisite minimum reformed gas cannot be reformed, and therefore, the electrical output of the fuel cell is set to zero. In this case, it is possible to supply the hydrocarbon-based fuel at the flow rate $F_R$ to the reformer and increase the temperature of the reforming catalyst layer by a heater annexed to the reformer, a burner, or the like until at least $F_R \geq F_{min}$ is satisfied. When $F_R \geq F_{min}$, the step D and the subsequent steps may be performed.

[Step D]

When the reformable flow rate $F_R$ calculated in the step B is equal to or more than the minimum value $F_{min}$, the step D is performed.

In the step D, when a fuel cell output demand value $P_D$ is equal to or less than the maximum electrical output $P_M$ of the fuel cell, step d1 is performed. $P_D \leq P_M$ means that the fuel cell can output the fuel cell output demand value $P_D$.

Or, when the fuel cell output demand value $P_D$ exceeds the maximum electrical output $P_M$ of the fuel cell, step d2 is performed. $P_D > P_M$ means that the electrical output of the fuel cell is insufficient for the fuel cell output demand value $P_D$.

Step d1

The flow rate $f(P_D)$ of the hydrocarbon-based fuel required to be supplied to the reforming catalyst layer in order to output the fuel cell output demand value $P_D$ from the fuel cell is calculated using the above function $F=f(P)$.

Then, when the calculated $f(P_D)$ is equal to or less than the reformable flow rate $F_R$ calculated in the step B, the electrical output of the fuel cell is set to $P_D$, and the flow rate of the hydrocarbon-based fuel supplied to the reforming catalyst layer is set to $f(P_D)$. $f(P_D) \leq F_R$ means that the hydrocarbon-based fuel at the flow rate $f(P_D)$ required to output an electrical output of the fuel cell output demand value $P_D$ can be reformed in the reforming catalyst layer. Therefore, the hydrocarbon-based fuel at this flow rate $f(P_D)$ is supplied to the reforming catalyst layer, and the obtained reformed gas is supplied to the fuel cell to output the electrical output of the fuel cell output demand value $P_D$ from the fuel cell.

On the other hand, when the calculated $f(P_D)$ exceeds the above calculated reformable flow rate $F_R$, the electrical output of the fuel cell is set to a P value that is the highest from amongst one or more P values calculated from $P=f^{-1}(F_R)$, but which is lower than the $P_D$ value, and the flow rate of the hydrocarbon-based fuel supplied to the reforming catalyst layer is set to $F_R$. $f(P_D) > F_R$ means that the hydrocarbon-based fuel at the flow rate $f(P_D)$ of the hydrocarbon-based fuel required to output the electrical output of the fuel cell output demand value $P_D$ cannot be reformed in the reforming catalyst layer. There may be only one P value calculated from $P=f^{-1}(F_R)$, and there may be a plurality of P values calculated from $P=f^{-1}(F_R)$. When there is only one such P value, the electrical output of the fuel cell is set to the very P value. When there are a plurality of such P values, a value that is the highest within a range of less than $P_D$ from amongst the plurality of P values is set as the electrical output of the fuel cell. In other words, when there are a plurality of such values, the hydrocarbon-based fuel at the reformable flow rate $F_R$ is supplied to the reforming catalyst layer, and the maximum electrical output obtained from the hydrocarbon-based fuel at the reformable flow rate $F_R$ is output from the fuel cell.

Step d2

As described above, when $P_D > P_M$ (the electrical output of the fuel cell is insufficient for the fuel cell output demand value $P_D$), the step d2 is performed.

The flow rate $f(P_M)$ of the hydrocarbon-based fuel supplied to the reforming catalyst layer required to be supplied to the reforming catalyst layer in order to output the maximum electrical output $P_M$ from the fuel cell is calculated using the above function $F=f(P)$.

When $f(P_M)$ is equal to or less than the above calculated reformable flow rate $F_R$, the electrical output of the fuel cell is set to $P_M$, and the flow rate of the hydrocarbon-based fuel supplied to the reforming catalyst layer is set to $f(P_M)$. $f(P_M) \leq F_R$ means that the hydrocarbon-based fuel at the flow rate $f(P_M)$ can be reformed in the reforming catalyst layer.

On the other hand, when $f(P_M)$ exceeds the above calculated reformable flow rate $F_R$, the electrical output of the fuel cell is set to a value that is the highest from amongst one or more P values calculated from $P=f^{-1}(F_R)$, and the flow rate of the hydrocarbon-based fuel supplied to the reforming catalyst layer is set to $F_R$. The maximum value among one or more P values calculated from $P=f^{-1}(F_R)$ is logically less than PD. $f(P_M)>F_R$ means that the hydrocarbon-based fuel at the flow rate $f(P_M)$ cannot be reformed in the reforming catalyst layer.

[Example of Load Following Operation]

How operation is performed under various conditions, when performing the load following operation of one certain fuel cell system, will be described below by giving specific examples, using FIGS. 2 to 5. However, the present invention is not limited thereto.

Figure 2:
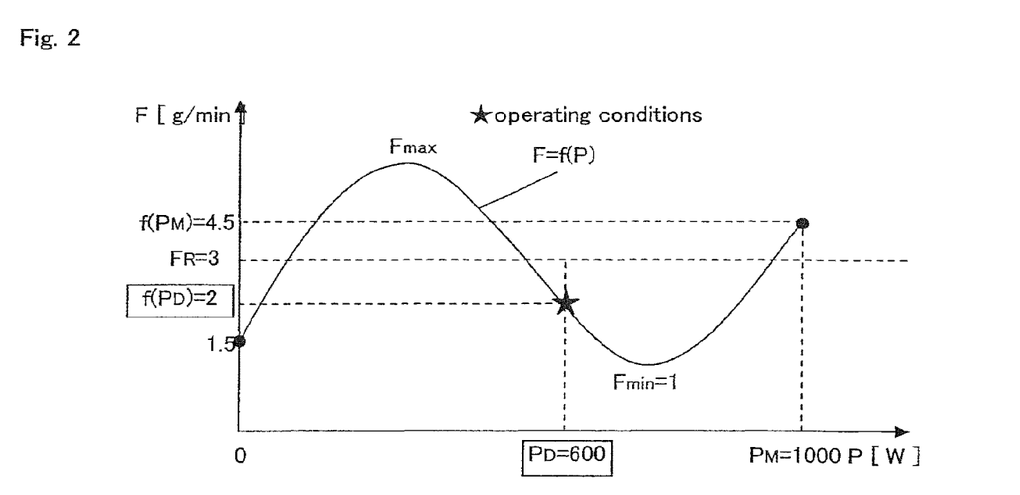
FIG. 2 is a schematic graph showing a correlation between electrical output P of a fuel cell and flow rate F of a hydrocarbon-based fuel required to be supplied to a reforming catalyst layer to obtain the electrical output P, for explaining the method of the present invention.
Figure 3:
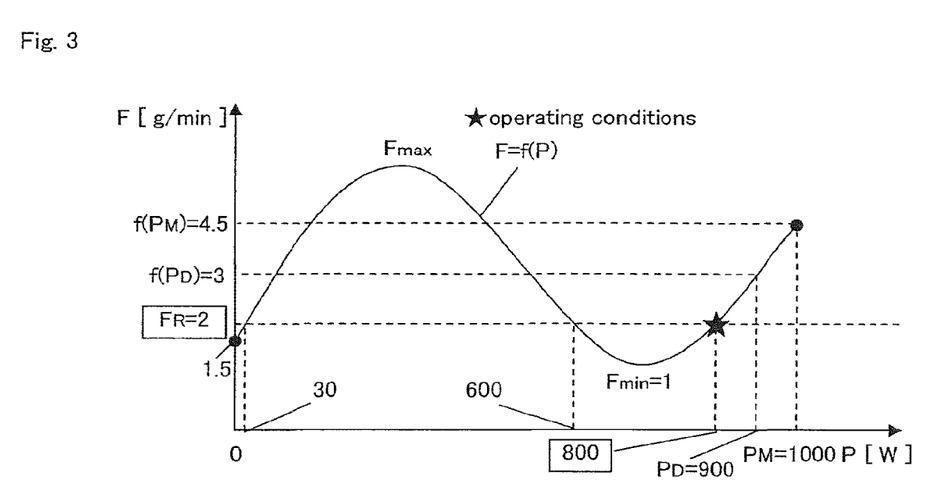
FIG. 3 is a schematic graph showing the correlation between the electrical output P of the fuel cell and the flow rate F of the hydrocarbon-based fuel required to be supplied to the reforming catalyst layer to obtain the electrical output P, for explaining the method of the present invention.
Figure 4:
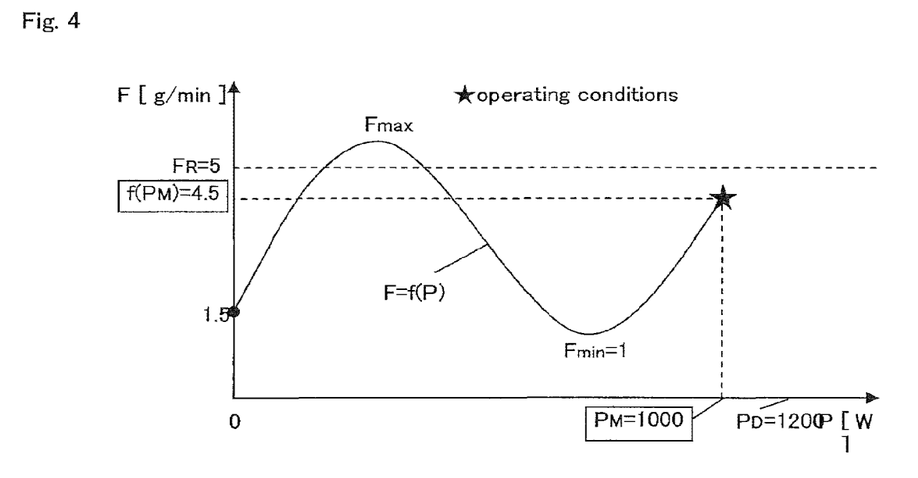
FIG. 4 is a schematic graph showing the correlation between the electrical output P of the fuel cell and the flow rate F of the hydrocarbon-based fuel required to be supplied to the reforming catalyst layer to obtain the electrical output P, for explaining the method of the present invention.
Figure 5:
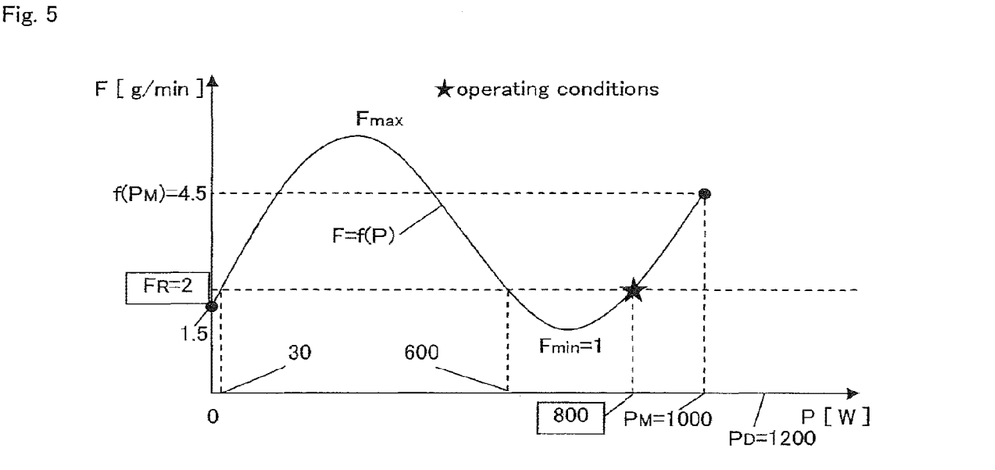
FIG. 5 is a schematic graph showing the correlation between the electrical output P of the fuel cell and the flow rate F of the hydrocarbon-based fuel required to be supplied to the reforming catalyst layer to obtain the electrical output P, for explaining the method of the present invention.

It is assumed that a correlation between electrical output P of the fuel cell and flow rate F of the hydrocarbon-based fuel required to be supplied to the reforming catalyst layer to obtain the electrical output P, that is, functions $F=f(P)$ and $P=f^{-1}(F)$, are beforehand obtained as shown in FIG. 2 (the same correlation also in FIGS. 3 to 5).

The temperature of the reforming catalyst layer is measured in the step A, and the reformable flow rate $F_R$ is calculated in the step B.

(Case 1)

As shown in FIG. 2, a case where
$P_D$=600 W, $P_M$=1000 W, $F_R$=3 g/min, and $F_{min}$=1 g/min
is considered.

In this case, $F_R$=3 g/min≥1 g/min=$F_{min}$, and therefore, the step C is not performed, and the step D is performed.

Then, $P_D$=600 W≤1000 W=$P_M$, and therefore, the step d1 rather than the step d2, is performed.

In the step d1 the flow rate $f(P_D)$ of the hydrocarbon-based fuel required to be supplied to the reforming catalyst layer in order to output an electric power of $P_D$ is calculated using the function $F=f(P)$. This value is 2 g/min.

$f(P_D)$=2 g/min≤3 g/min=$F_R$, and therefore, the electrical output of the fuel cell is set to $P_D$, that is, 600 W, and the flow rate of the hydrocarbon-based fuel supplied to the reforming catalyst layer is set to $f(P_D)$, that is, 2 g/min. In FIGS. 2 to 5, a point showing operation conditions obtained in this manner is marked with a star.

(Case 2)

As shown in FIG. 3, a case where
$P_D$=900 W and $F_R$=2 g/min
is considered. The fuel cell output demand value $P_D$ fluctuates in load following operation, and $F_R$ varies depending on the temperature of the reforming catalyst layer. $P_M$=1000 W and $F_{min}$=1 g/min are basically values inherent to the fuel cell system, and therefore are the same as the above example.

In this case, $F_R$=2 g/min≥1 g/min=$F_{min}$, and therefore, the step C is not performed, and the step D is performed.

Then, $P_D$=900 W≤1000 W=$P_M$, and therefore, the step d1, rather than the step d2, is performed.

In the step d1, the flow rate $f(P_D)$ of the hydrocarbon-based fuel required to be supplied to the reforming catalyst layer in order to output an electric power of $P_D$ is calculated using the function $F=f(P)$. This value is 3 g/min.

$f(P_D)$=3 g/min>2 g/min=$F_R$, and therefore, the electrical output of the fuel cell is set to a value that is the highest from amongst one or more P values calculated from $P=f^{-1}(F_R)$, but which is lower than the $P_D$ value, and the flow rate of the hydrocarbon-based fuel supplied to the reforming catalyst layer is set to $F_R$, that is, 2 g/min.

The P values calculated from $P=f^{-1}(F_R)$ are 30 W, 600 W, and 800 W. Among these values, a value that is the highest, but is lower than $P_D$ (900 W), is 800 W. Therefore, the electrical output of the fuel cell is set to 800 W.

(Case 3)

As shown in FIG. 4, a case where
$P_D$=1200 W and $F_R$=5 g/min
is considered. $P_M$=1000 W and $F_{min}$=1 g/min are the same as the above example.

In this case, $F_R$=5 g/min≥1 g/min=$F_{min}$, and therefore, the step C is not performed, and the step D is performed.

Then, $P_D$=1200 W>1000 W=$P_M$, and therefore, the step d2, rather than the step d1, is performed.

In the step d2, the flow rate $f(P_M)$ of the hydrocarbon-based fuel supplied to the reforming catalyst layer required to be supplied to the reforming catalyst layer in order to output an electrical output of the maximum electrical output $P_M$ (1000 W) is calculated using the above function $F=f(P)$. This value is 4.5 g/min.

$f(P_M)$=4.5 g/min≤5 g/min=$F_R$, and therefore, the electrical output of the fuel cell is set to $P_M$, that is, 1000 W, and the flow rate of the hydrocarbon-based fuel supplied to the reforming catalyst layer is set to $f(P_M)$, that is, 4.5 g/min.

(Case 4)

As shown in FIG. 5, a case where
$P_D$=1200 W and $F_R$=2 g/min
is considered. $P_M$=1000 W and $F_{min}$=1 g/min are the same as the above example.

In this case, $F_R$=2 g/min≥1 g/min=$F_{min}$, and therefore, the step C is not performed, and the step D is performed.

Then, $P_D$=1200 W>1000 W=$P_M$, and therefore, the step d2, rather than the step d1, is performed.

In the step d2, the flow rate $f(P_M)$ of the hydrocarbon-based fuel supplied to the reforming catalyst layer required to be supplied to the reforming catalyst layer in order to output an electrical output of the maximum electrical output $P_M$ (1000 W) is calculated using the above function $F=f(P)$. This value is 4.5 g/min.

$f(P_M)$=4.5 g/min>2 g/min=$F_R$, and therefore, the electrical output of the fuel cell is set to a value that is the highest from amongst one or more P values calculated from $P=f^{-1}(F_R)$, and the flow rate of the hydrocarbon-based fuel supplied to the reforming catalyst layer is set to $F_R$, that is, 2 g/min.

The P values calculated from $P=f^{-1}(F_R)$ are 30 W, 600 W, and 800 W. 800 W that is the highest among these is set as the electrical output of the fuel cell.

In the description using FIGS. 2 to 5, the correlation between F and P is extreme for explanation. But, it is considered that practically, there are many cases close to a correlation as shown in FIG. 6. In FIG. 6, in a range in which the electrical output P is small, that is, in a range in which the electrical output P is 0 W or more and 300 W or less, the flow rate F of the hydrocarbon-based fuel is fixed at 1.5 g/min in order to preferably maintain the SOFC at a temperature at which electric power can be generated. Also, in a range in which the electrical output P is large, that is, in a range in which the electrical output P is larger than 300 W and the maximum electrical output $P_M$ (1000 W) or less, the flow rate F of the hydrocarbon-based fuel increases from 1.5 g/min to 4.5 g/min in proportion to the electrical output P in order to make electric power generation efficiency high.

[Calculation of Reformable Flow Rate (Calculation of $F_R$)]

The method for calculating the flow rate $F_R$ of the hydrocarbon-based fuel that can be reformed in the reforming catalyst layer, in the step B, based on the temperature of the reforming catalyst layer measured in the step A, will be described below.

The flow rate of the hydrocarbon-based fuel that can be reformed in the reforming catalyst layer refers to a flow rate such that when the hydrocarbon-based fuel at this flow rate is supplied to the reforming catalyst layer, the composition of the gas discharged from the reforming catalyst layer becomes a composition suitable to be supplied to the anode of the fuel cell.

For example, the reformable flow rate in the reforming catalyst layer may be any flow rate equal to or less than the maximum value of flow rates at which the supplied hydrocarbon-based fuel can be decomposed to a C1 compound(s) (a compound(s) having the carbon number of one). In other words, the reformable flow rate in the reforming catalyst layer may be any flow rate equal to or less than the maximum value of the flow rate of the hydrocarbon-based fuel supplied to the reforming catalyst layer when reforming can proceed in the reforming catalyst layer until a composition is obtained in which a C2+ component(s) (a component(s) having the carbon number of two or more) in the gas at the outlet of the reforming catalyst layer has a concentration, which does not cause problems of anode degradation and flow blockage due to carbon deposition, or less. The concentration of the C2+ component(s) in this case is preferably 50 ppb or less as a mass fraction in the reformed gas. And in this case, it is enough that the gas at the outlet of the reforming catalyst layer is reducing gas. Methane is permitted to be contained in the gas at the outlet of the reforming catalyst layer. In the reforming of the hydrocarbon-based fuel, usually, methane remains in the equilibrium theory. Even if carbon is contained in the gas at the outlet of the reforming catalyst layer in the form of methane, CO, or $CO_2$, carbon deposition can be prevented by adding steam as required. When methane is used as the hydrocarbon-based fuel, it is enough that reforming proceeds so that the gas at the outlet of the reforming catalyst layer becomes reducing.

With respect to the reducing property of the gas at the outlet of the reforming catalyst layer, it is enough that the property is to the extent that if this gas is supplied to the anode, the oxidative degradation of the anode is suppressed. In order to do this, for example, the partial pressures of oxidizing $O_2$, $H_2O$, and $CO_2$, and the like contained in the gas at the outlet of the reforming catalyst layer may be lower than their equilibrium partial pressures of oxidation reactions of the anode electrode. For example, when the anode electrode material is Ni, and the anode temperature is 800° C., the partial pressure of $O_2$ contained in the gas at the outlet of the reforming catalyst layer may be less than $1.2 \times 10^{-14}$ atm ($1.2 \times 10^{-9}$ Pa), the partial pressure ratio of $H_2O$ to $H_2$ may be less than $1.7 \times 10^2$, and the partial pressure ratio of $CO_2$ to CO may be less than $1.8 \times 10^2$.

The reformable flow rate depends on the temperature of the reforming catalyst layer. Therefore, the calculation of the reformable flow rate in the reforming catalyst layer is performed based on the measured temperature of the reforming catalyst layer.

The reformable flow rate $F_R$ in the reforming catalyst layer may be beforehand obtained as a function of the temperature T of the reforming catalyst layer by experiment ($F_R$ is represented also as $F_R(T)$ to explicitly show that it is a function of temperature). Also, it is possible to determine the reformable flow rate by dividing the function obtained by experiment by a safety factor, or offsetting the temperature to the safe side. The unit of $F_R(T)$ is, for example, mol/s. The reformable flow rate $F_R(T)$ may be a function of only the temperature T. But, this is not limiting, and the reformable flow rate $F_R$ may be a function having, in addition to the temperature T, a variable, such as the volume of the catalyst layer or the concentration of the gas component, other than T. In this case, when the reformable flow rate $F_R$ is calculated, it is possible to appropriately obtain a variable other than T, and calculate the reformable flow rate $F_R$ from the variable other than T, and the measured T.

The temperature measurement position in the reforming catalyst layer may be one point or a plurality of points. Also, for temperature conditions, a representative temperature, such as the average value of a plurality of points, or the like may be used.

It is possible to consider a plurality of divided regions into which the reforming catalyst layer is divided along the gas flow direction, measure temperatures at a plurality of points in the reforming catalyst layer at different positions along the gas flow direction, calculate one or more flow rates of the fuel that can be reformed in one or more of the plurality of divided regions, based on the temperatures, and set the total value of the calculated flow rate(s) as the flow rate of the fuel that can be reformed in the reforming catalyst layer.

[Others]

It is not always necessary to perform the same type of reforming during the load following operation.

Also, by interconnecting the fuel cell to a system power supply, the shortage of the electrical output of the fuel cell with respect to an electric power load may be supplied from the system power supply.

The fuel cell output demand value $P_D$ may be the value of an electric power load measured by an appropriate electric power meter. Alternatively, when the fuel cell is interconnected to another power generator or storage battery, part of a measured electric power load may be set as the fuel cell output demand value $P_D$.

In the step D, when the flow rate of the hydrocarbon-based fuel is determined, it is possible to accordingly calculate and determine the flow rate of a fluid supplied to the indirect internal reforming SOFC, other than the hydrocarbon-based fuel, and the input and output of electricity to and from the indirect internal reforming SOFC, other than the output of the SOFC, from beforehand obtained functions of the electrical output P, as required.

The present invention is particularly effective when the hydrocarbon-based fuel supplied to the reforming catalyst layer includes a hydrocarbon-based fuel having the carbon number of two or more. According to the present invention, it is possible to make the concentration of a compound(s) having the carbon number of two or more in the reformed gas be 50 ppb or less on a mass basis, even in load following operation. And thereby, anode degradation and flow blockage due to carbon deposition can be more reliably prevented.

[Another Embodiment of Indirect Internal Reforming SOFC System]

Figure 7:
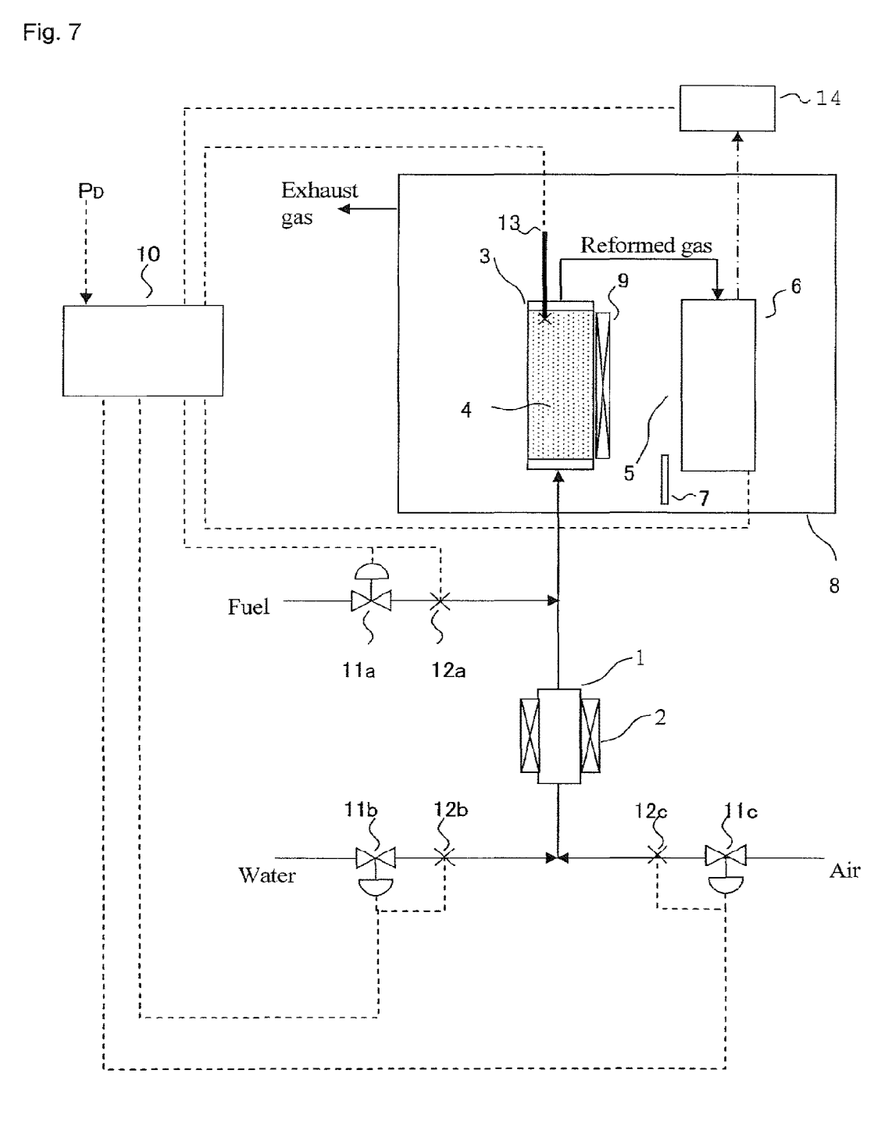
FIG. 7 is a schematic diagram showing the outline of another example of the indirect internal reforming SOFC system that can perform the present invention.

An embodiment of an indirect internal reforming SOFC system that can be suitably used to perform the above method will be described using FIG. 7.

This fuel cell system includes a reformer 3 for reforming a hydrocarbon-based fuel to produce a reformed gas containing hydrogen. The reformer includes a reforming catalyst layer 4.

Also, this fuel cell system includes a high temperature fuel cell (here, SOFC) 6 for generating electric power using this reformed gas.

This fuel cell system further includes the following means I to IV.

I) A means for measuring the temperature of the reforming catalyst layer.

II) A means for calculating a reformable flow rate $F_R$ that is a flow rate of the hydrocarbon-based fuel that can be reformed in the reforming catalyst layer, based on the measured temperature of the reforming catalyst layer.

III) A means for, when the calculated reformable flow rate $F_R$ is smaller than $F_{min}$, stopping electric power generation in the fuel cell.

IV) A means for, when the calculated reformable flow rate $F_R$ is equal to or more than $F_{min}$, performing step d1 if a fuel cell output demand value $P_D$ is equal to or less than the maximum electrical output $P_M$, and performing step d2 if the fuel cell output demand value $P_D$ exceeds the maximum electrical output $P_M$.

A temperature sensor, such as a thermocouple 13, for measuring the temperature of the reforming catalyst layer may be used for the means I.

A control means (appropriately including arithmetic function) publicly known in the field of process control or fuel cell system control, such as a computer 10, may be used for each of the means II, III, and IV. One control means may be used for each of the means II, III, and IV, or only one control means, for example, the computer 10, may be used for the means II, III, and IV. When a plurality of control means are used, these may appropriately send and receive information to and from each other.

The control means may appropriately store constants, functions, tables, and the like. For example, the control means used for the means II may store a function $F_R(T)$ for obtaining the above $F_R$, the control means used for the means III may store the above minimum value $F_{min}$, and the control means used for the means IV may store $F_{min}$, $P_M$, a function $F=f(P)$, and a function $P=f^{-1}(F_R)$.

Required values may be appropriately input to the control means. For example, a reforming catalyst layer temperature is input to the control means used for the means II. In other words, this control means may receive a signal corresponding to a reforming catalyst layer temperature. Also, the control means used for the means IV may receive a signal corresponding to $P_D$.

The control means used for the means III may stop electric power generation in the fuel cell. Also, the control means used for the means IV may control the electrical output of the fuel cell.

The means III and the means IV may include, in addition to the above control means, an electric power conditioner 14 to control the electrical output of the fuel cell.

The control means used for the means IV may control the flow rate of the hydrocarbon-based fuel supplied to the reforming catalyst layer. The means IV may include, in addition to the above control means, a flow rate control valve 11*a* and a flowmeter 12*a* for the hydrocarbon-based fuel to control the flow rate of the hydrocarbon-based fuel supplied to the reforming catalyst layer. Alternatively, the means IV may include a pump for the hydrocarbon-based fuel that can vary the flow rate according to the input signal.

The fuel cell system may be equipped with, for example, a flow rate control valve 11*b* and a flowmeter 12*b* for water, as required, to supply steam to the reforming catalyst layer. Alternatively, the fuel cell system may be equipped with a pump for water that can vary the flow rate according to the input signal. Also, the fuel cell system may be equipped with, for example, a flow rate control valve 11*c* and a flowmeter 12*c* for air, as required, to supply an oxygen-containing gas to the reforming catalyst layer. Alternatively, the fuel cell system may be equipped with a blower for air that can vary the flow rate according to the input signal.

[Hydrocarbon-based Fuel]

It is possible to use a hydrocarbon-based fuel appropriately selected from compounds of which molecules contain carbon and hydrogen (may also contain other elements, such as oxygen) or mixtures thereof that are publicly known as raw materials of reformed gas in the field of high temperature fuel cells. It is possible to use compounds of which molecules contain carbon and hydrogen, such as hydrocarbons and alcohols. For example, hydrocarbon fuels, such as methane, ethane, propane, butane, natural gas, LPG (liquefied petroleum gas), city gas, gasoline, naphtha, kerosene and gas oil, alcohols, such as methanol and ethanol, ethers, such as dimethylether, and the like may be used.

Particularly, kerosene and LPG are preferred because they are readily available. In addition, they can be stored in a stand-alone manner, and therefore, they are useful in areas where the city gas pipeline is not built. Further, a high temperature fuel cell power generating equipment using kerosene or LPG is useful as an emergency power supply. Particularly, kerosene is preferred because it is easy to handle.

[High Temperature Fuel Cell]

The present invention may be suitably applied to a system equipped with a high temperature fuel cell in which anode degradation and flow blockage due to carbon deposition may occur. Such a fuel cell includes an SOFC and an MCFC.

The SOFC may be appropriately selected for use from publicly known SOFCs having various shapes, such as planar and tubular SOFCs. In the SOFC, generally, an oxygen-ion conductive ceramic or a proton-ion conductive ceramic is used as the electrolyte.

The MCFC may also be appropriately selected for use from publicly known MCFCs.

The SOFC or the MCFC may be a single cell, but practically, a stack in which a plurality of single cells are arrayed (the stack is sometimes referred to as a bundle in the case of a tubular type, and the stack in this specification includes a bundle) is preferably used. In this case, one stack or a plurality of stacks may be used.

Among high temperature fuel cells, an indirect internal reforming SOFC is excellent in that the thermal efficiency of the system can be increased. The indirect internal reforming SOFC has a reformer for producing a reformed gas containing hydrogen from a hydrocarbon-based fuel using a steam reforming reaction and an SOFC. In this reformer, a steam reforming reaction may be performed, and autothermal reforming in which a steam reforming reaction is accompanied by a partial oxidation reaction may be performed. In terms of the electric power generation efficiency of the SOFC, preferably, no partial oxidation reaction occurs after the completion of start-up. The autothermal reforming is designed so that steam reforming is predominant after the completion of start-up, and therefore, the reforming reaction is an overall endothermic reaction. Heat required for the reforming reaction is supplied from the SOFC. The reformer and the SOFC are housed in one module container and modularized. The reformer is disposed at a position where it receives thermal radiation from the SOFC. Thus, the reformer is heated by thermal radiation from the SOFC during electric power generation. Also, the SOFC may be heated by combusting an anode off-gas, which is discharged from the SOFC, at the cell outlet.

In the indirect internal reforming SOFC, the reformer is preferably disposed at a position where radiation heat can be directly transferred from the SOFC to the outer surface of the reformer. Therefore, it is preferred that there is substantially no obstacle between the reformer and the SOFC, that is, it is preferred to make the region between the reformer and the SOFC be an empty space. Also, the distance between the reformer and the SOFC is preferably as short as possible.

Each supply gas is supplied to the reformer or the SOFC, after being appropriately preheated as required.

The module container may be any appropriate container capable of housing the SOFC and the reformer. An appropriate material having resistance to the environment used, for example, stainless steel, may be used as the material of the container. A connection port is appropriately provided for the container for gas interfacing or the like.

Particularly when a cell outlet opens in the module container, the module container is preferably hermetic in order to prevent communication between the interior of the module container and the surroundings (atmosphere).

A combustion region is a region where the anode off-gas discharged from the anode of the SOFC can be combusted. For example, the anode outlet is opened in the enclosure, and a space near the anode outlet may be the combustion region. This combustion may be performed using, for example, a cathode off-gas, as an oxygen-containing gas. In order to do this, a cathode outlet may be opened in the enclosure.

In order to combust a combustion fuel or the anode off-gas, an ignition means, such as an igniter, may be appropriately used.

[Reformer]

The reformer produces a reformed gas containing hydrogen from a hydrocarbon-based fuel.

In the reformer, any of steam reforming, partial oxidation reforming and autothermal reforming in which a steam reforming reaction is accompanied by a partial oxidation reaction may be performed.

In the reformer, a steam reforming catalyst having steam reforming activity, a partial oxidation reforming catalyst having partial oxidation reforming activity, or an autothermal reforming catalyst having both partial oxidation reforming activity and steam reforming activity may be appropriately used.

With respect to the structure of the reformer, a structure publicly known as that of a reformer may be appropriately used. For example, the structure of the reformer may be a structure having a region for housing a reforming catalyst in a vessel which can be closed to the atmosphere, and having an introduction port for fluids required for reforming and a discharge port for a reformed gas.

The material of the reformer may be appropriately selected for use from materials publicly known as those of reformers, considering resistance in the environment used.

The shape of the reformer may be an appropriate shape, such as a rectangular parallelepiped shape or a circular tube shape.

A hydrocarbon-based fuel (vaporized beforehand as required) and steam, and further an oxygen-containing gas, such as air, as required, may be supplied to the reformer (the reforming catalyst layer), each independently, or appropriately mixed beforehand. The reformed gas is supplied to the anode of the SOFC.

[Reforming Catalyst]

A publicly known catalyst may be used for each of the steam reforming catalyst, the partial oxidation reforming catalyst and the autothermal reforming catalyst used in the reformer. Examples of the partial oxidation reforming catalyst include a platinum-based catalyst. Examples of the steam reforming catalyst include ruthenium-based and nickel-based catalysts. Examples of the autothermal reforming catalyst include a rhodium-based catalyst.

A temperature at which the partial oxidation reforming reaction can proceed is, for example, 200° C. or more. A temperature at which the steam reforming reaction can proceed is, for example, 400° C. or more.

[Operation Conditions of Reformer]

The conditions during load following operation of the reformer for each of steam reforming, autothermal reforming, and partial oxidation reforming will be described below.

In steam reforming, steam is added to a reforming raw material, such as kerosene. The reaction temperature of the steam reforming may be in the range of, for example, 400° C. to 1000° C., preferably 500° C. to 850° C., and further preferably 550° C. to 800° C. An amount of the steam introduced into the reaction system is defined as a ratio of the number of moles of water molecules to the number of moles of carbon atoms contained in the hydrocarbon-based fuel (steam/carbon ratio). This value is preferably 1 to 10, more preferably 1.5 to 7, and further preferably 2 to 5. When the hydrocarbon-based fuel is liquid, a space velocity (LHSV) can be represented as A/B, wherein a flow velocity of the hydrocarbon-based fuel in a liquid state is represented as A (L/h), and a volume of the catalyst layer is represented as B (L). This value is set in the range of preferably 0.05 to 20 $h^{-1}$, more preferably 0.1 to 10 $h^{-1}$, and further preferably 0.2 to 5 $h^{-1}$.

In autothermal reforming, in addition to the steam, an oxygen-containing gas is added to the reforming raw material. The oxygen-containing gas may be pure oxygen, but in terms of the ease of availability, air is preferred. The oxygen-containing gas may be added so that the endothermic reaction accompanying the steam reforming reaction is balanced, and an amount of heat generation such that the temperature of the reforming catalyst layer and the SOFC can be maintained or increased is obtained. With respect to the amount of the oxygen-containing gas added, a ratio of the number of moles of oxygen molecules to the number of moles of carbon atoms contained in the hydrocarbon-based fuel (oxygen/carbon ratio) is preferably 0.005 to 1, more preferably 0.01 to 0.75, and further preferably 0.02 to 0.6. A reaction temperature of the autothermal reforming reaction is set in the range of, for example, 400° C. to 1000° C., preferably 450° C. to 850° C., and further preferably 500° C. to 800° C. When the hydrocarbon-based fuel is liquid, the space velocity (LHSV) is selected in the range of preferably 0.05 to $20^{-1}$, more preferably 0.1 to $10^{-1}$, and further preferably 0.2 to $5^{-1}$. With respect to an amount of the steam introduced into the reaction system, the steam/carbon ratio is preferably 1 to 10, more preferably 1.5 to 7, and further preferably 2 to 5.

In partial oxidation reforming, an oxygen-containing gas is added to the reforming raw material. The oxygen-containing gas may be pure oxygen, but in terms of the ease of availability, air is preferred. An amount of the oxygen-containing gas added is appropriately determined in terms of heat loss and the like to ensure a temperature at which the reaction proceeds. With respect to this amount, the ratio of the number of moles of oxygen molecules to the number of moles of carbon atoms contained in the hydrocarbon-based fuel (oxygen/carbon ratio) is preferably 0.1 to 3 and more preferably 0.2 to 0.7. A reaction temperature of the partial oxidation reaction may be set in the range of, for example, 450° C. to 1000° C., preferably 500° C. to 850° C., and further preferably 550° C. to 800° C. When the hydrocarbon-based fuel is liquid, the space velocity (LHSV) is selected in the range of preferably 0.1 to $30^{-1}$. Steam can be introduced into the reaction system to suppress the generation of soot, and with respect to an amount of the steam, the steam/carbon ratio is preferably 0.1 to 5, more preferably 0.1 to 3, and further preferably 1 to 2.

[Other Equipment]

In the high temperature fuel cell system used in the present invention, publicly known components of a high temperature fuel cell system may be appropriately provided as required. Specific examples of the publicly known components include a desulfurizer for reducing a sulfur content of a hydrocarbon-based fuel; a vaporizer for vaporizing a liquid; pressure increasing means for pressurizing various fluids, such as a pump, a compressor, and a blower; flow rate controlling means or flow path blocking/switching means for controlling the flow rate of a fluid, or blocking/switching the flow of a fluid, such as a valve; a heat exchanger for performing heat exchange and heat recovery; a condenser for condensing a gas; heating/warming means for externally heating various equipment with steam or the like; storage means of a hydrocarbon-based fuel and combustibles; an air or electrical system for instrumentation; a signal system for control; a control device; and an electrical system for output and powering; and the like.

INDUSTRIAL APPLICABILITY

The present invention can be applied to a high temperature fuel cell system used for, for example, a stationary or mobile electric power generation system and a cogeneration system.

The invention claimed is:

1. A method of load following operation of a fuel cell system comprising a reformer having a reforming catalyst layer, for reforming a hydrocarbon-based fuel to produce a reformed gas containing hydrogen, and a high temperature fuel cell for generating electric power using the reformed gas, the method comprises determining before start of the load following operation:

functions $F=f(P)$ and $P=f^{-1}(F)$, where P is an electrical output of the fuel cell and F is a flow rate of the hydrocarbon-based fuel required to be supplied to the reforming catalyst layer in order to output the electrical output P from the fuel cell, $P=f^{-1}(F)$ is an inverse function of $F=f(P)$, wherein flow rate F is uniquely determined for each value of P in the range of 0 to $P_M$, wherein $P_M$ represents maximum electrical output of the fuel cell and wherein for at least one value of F there are plurality of P values; and a minimum value of flow rate of the hydrocarbon-based fuel, which is represented as $F_{min}$, said $F_{min}$ being a minimum value that is given by the function $F=f(P)$ when P ranges in the range of 0 to $P_M$, the load following method comprising:

A) measuring a temperature of the reforming catalyst layer;

B) calculating a reformable flow rate $F_R$ that is a flow rate of the hydrocarbon-based fuel capable of being reformed in the reforming catalyst layer, based on the measured temperature of the reforming catalyst layer;

C) when the calculated reformable flow rate $F_R$ is smaller than the minimum value $F_{min}$, stopping electric power generation in the fuel cell; and D) when the calculated reformable flow rate $F_R$ is equal to or more than the minimum value $F_{min}$, performing step d1 if a fuel cell output demand value $P_D$ is equal to or less than the maximum electrical output $P_M$, and performing step d2 if the fuel cell output demand value $P_D$ exceeds the maximum electrical output $P_M$, d1) calculating a flow rate $f(P_D)$ of the hydrocarbon-based fuel required to be supplied to the reforming catalyst layer in order to output the fuel cell output demand value $P_D$ from the fuel cell, using the function $F=f(P)$, if $f(P_D)$ is equal to or less than the calculated reformable flow rate $F_R$, setting an electrical output of the fuel cell to $P_D$, and setting a flow rate of the hydrocarbon-based fuel supplied to the reforming catalyst layer to $f(P_D)$, and if $f(P_D)$ exceeds the calculated reformable flow rate $F_R$, setting the electrical output of the fuel cell to a P value that is the highest from amongst one or more P values calculated from $P=f^{-1}(F_R)$, but which is lower than the $P_D$ value, and setting the flow rate of the hydrocarbon-based fuel supplied to the reforming catalyst layer to $F_R$, d2) calculating a flow rate $f(P_M)$ of the hydrocarbon-based fuel supplied to the reforming catalyst layer required to be supplied to the reforming catalyst layer in order to output the maximum electrical output $P_M$ from the fuel cell, using the function $F=f(P)$, if $f(P_M)$ is equal to or less than the calculated reformable flow rate $F_R$, setting the electrical output of the fuel cell to $P_M$, and setting the flow rate of the hydrocarbon-based fuel supplied to the reforming catalyst layer to $f(P_M)$, and if $f(P_M)$ exceeds the calculated reformable flow rate $F_R$, setting the electrical output of the fuel cell to a P value that is the highest from amongst one or more P values calculated from $P=f^{-1}(F_R)$, and setting the flow rate of the hydrocarbon-based fuel supplied to the reforming catalyst layer to $F_R$, wherein output demand value $P_D$ fluctuates with time.

2. The method according to claim 1, wherein steps A to D are repeatedly performed during the load following operation.

3. The method according to claim 1, wherein the hydrocarbon-based fuel comprises a hydrocarbon-based fuel with a carbon number of two or more.

4. The method according to claim 3, wherein the concentration of a compound with a carbon number of two or more carbon atoms in the reformed gas is 50 ppb or less on a mass basis.

5. The method according to claim 1, wherein the fuel cell system comprises a solid oxide fuel cell.

6. The method according to claim 5, wherein the solid oxide fuel cell is an indirect internal reforming solid oxide fuel cell.

7. The method according to claim 6, wherein the reformer is disposed at a position where radiation head can be directly transferred from the solid-oxide fuel cell to the reformer.

8. The method according to claim 1, wherein the fuel cell system comprises a molten carbonate fuel cell.

* * * * *